United States Patent
Kodavalla (10) Patent No.: US 10,241,559 B2
(45) Date of Patent: Mar. 26, 2019

(54) SYSTEM AND METHOD FOR DYNAMICALLY SWITCHING HIGH-SPEED CLOCK OF A HOST DEVICE

(71) Applicant: Wipro Limited, Bangalore (IN)

(72) Inventor: Vijay Kumar Kodavalla, Bangalore (IN)

(73) Assignee: Wipro Limited, Bangalore (IN)

( * ) Notice: Subject to any disclaimer, the term of this patent is extended or adjusted under 35 U.S.C. 154(b) by 5 days.

(21) Appl. No.: 14/984,700

(22) Filed: Dec. 30, 2015

(65) Prior Publication Data

US 2017/0123472 A1  May 4, 2017

(30) Foreign Application Priority Data

Oct. 30, 2015 (IN) .......................... 5886/CHE/2015

(51) Int. Cl.
  *G06F 1/32*  (2019.01)
  *G06F 13/40*  (2006.01)
  *G06F 1/324*  (2019.01)
  *G06F 13/42*  (2006.01)

(52) U.S. Cl.
  CPC .......... *G06F 1/324* (2013.01); *G06F 13/4068* (2013.01); *G06F 13/4273* (2013.01)

(58) Field of Classification Search
  CPC .......................... G06F 1/324; G06F 13/4068
  See application file for complete search history.

(56) References Cited

U.S. PATENT DOCUMENTS

| | | | | |
|---|---|---|---|---|
| 5,136,695 A * | 8/1992 | Goldshlag | ............. | G06F 3/1415 345/2.1 |
| 5,640,176 A * | 6/1997 | Mundt | .................... | G06F 3/165 713/321 |
| 6,643,792 B1 * | 11/2003 | Kurosawa | ................. | G06F 1/12 713/400 |
| 2005/0091564 A1* | 4/2005 | Oshita | ................... | H04L 1/1874 714/748 |
| 2005/0137970 A1* | 6/2005 | Houle | .................... | G06Q 20/10 705/39 |
| 2007/0288671 A1* | 12/2007 | Bohm | ................... | G06F 1/3203 710/105 |
| 2009/0249090 A1* | 10/2009 | Schmitz | ................ | G06F 1/3203 713/300 |
| 2009/0282277 A1* | 11/2009 | Sedarat | ................. | G06F 1/3209 713/320 |
| 2010/0067633 A1* | 3/2010 | Den Besten | .............. | H03L 7/10 375/373 |
| 2013/0109371 A1* | 5/2013 | Brogan | ................. | G06F 1/1626 455/420 |
| 2015/0089259 A1* | 3/2015 | Warren | ................... | G06F 1/325 713/322 |

* cited by examiner

*Primary Examiner* — Vincent H Tran
*Assistant Examiner* — Chad G Erdman
(74) *Attorney, Agent, or Firm* — LeClairRyan PLLC (57) ABSTRACT

This disclosure relates generally to a host-peripheral interface, and more particularly to an apparatus and method for dynamically switching a high-speed clock of a host device. In one embodiment, a method is provided for dynamically switching a high-speed clock of a host device. The method comprises determining a status of the host device and a peripheral device coupled to the host device with respect to a transmission and a reception of high-speed data respectively, and switching the high-speed clock between the host device and the peripheral device based on the status.

18 Claims, 7 Drawing Sheets

SYSTEM AND METHOD FOR DYNAMICALLY SWITCHING HIGH-SPEED CLOCK OF A HOST DEVICE

This application claims the benefit of Indian Patent Application Serial No. 5886/CHE/2015 filed Oct. 30, 2015, which is hereby incorporated by reference in its entirety.

FIELD

This disclosure relates generally to a host-peripheral interface, and more particularly to system and method for dynamically switching a high-speed clock of a host device.

BACKGROUND

A communication interface enables data transmission between two or more electronic devices including host and peripheral devices. For example, a mobile industry processor interface (MIPI) is a widely adopted communication interface standard between a host device and a peripheral device, and is prevalent in products such as mobile electronic devices, digital cameras, display devices, and portable tablets and laptop computers. MIPI has standardized interconnect protocol between a host and peripherals and is based on very high-speed serial interface, optimized for power. There are several higher layer standards in MIPI such as a display serial interface (DSI), a camera serial interface (CSI), an interface between radio frequency transceiver integrated circuit and baseband integrated circuit (DigRF), low latency interface (LLI), and so forth along with physical layer specifications such as D-PHY and M-PHY.

D-PHY specification provides a high-speed serial interface solution for communications between various components in an electronic device. The D-PHY solution is capable of expanding a bandwidth of a transmission interface through a low-power consumption approach. For data transmission, the MIPI D-PHY specification defines two modes—a high-speed mode (speed up to 1.5 Gbps) and a low-power mode (speed up to 10 Mbps). The high-speed mode is used for high-speed data (e.g., video data) traffic and low power mode is used for transferring control information. In high-speed mode, there is a source synchronous clock on a separate lane between the host and peripherals. In contrast, the low power mode is achieved through a bidirectional data lane between the host and peripherals and the clock is expected to be extracted from the bidirectional data lane.

Further, in high-speed mode, either non-burst data and continuous clock mode or burst data (transferring data in a fraction of time and then switching to low power mode) and non-continuous clock mode (shutting-off and turning-on clock) may be employed for data transfer. Typically, non-burst data and continuous clock mode is employed with the peripherals having no support for burst data transfer. For peripherals supporting burst data transfer, burst data and non-continuous clock mode is employed as it consumes lower power. The MIPI interface is typically in low-power mode between high-speed data lines or frames during horizontal or vertical blanking time. But, the non-continuous high-speed clock lane shutting-off time parameters with respect to video burst completion on data lanes is defined as static setting (pre-configured time periods) under host control. The host shuts-off (i.e., switches to low-power mode) the high-speed clock lane after completing video burst on data lanes of every line of video frame or end of a video frame, and after waiting for pre-configured time period. Further, the host starts the high-speed clock lane before the next video line of video frame or a new video frame starts. The time period between turning-on high-speed clock lane to starting video burst on data lanes is again based on pre-configured time period, controlled by the host. In other words, at the start of data line or frame, host starts sending clock and after waiting for pre-configured time period starts sending first pixel onwards. Similarly, at the end of data line or frame, host stops sending clock after sending last pixel and after waiting for pre-configured time period.

Typically, this static pre-configured time periods are determined after taking into account worst case scenarios during data transfer. For example, in burst data and non-continuous clock mode, the minimum time period between turning-on clock to high-speed data is about 6 high-speed clock cycles. As per MIPI standard, if a particular protocol at the peripheral side requires more than 6 clock cycles, the master side protocol should ensure that these are transmitted. In one example, the maximum number of cycles needed may be in the range of 1000 or 2000 clock cycles. A given peripheral may have this minimum to maximum variation under various operating conditions. Also, there may be significant variation among various peripherals. As there is variation, the host should set pre-configured time period for worst case maximum scenario, which may be 1000 or 2000 clock cycles in this example. Similarly, the minimum time period between last high-speed data to shutting-off clock is about 52 high-speed clock cycles+60 nano seconds (ns). As per MIPI standard, if a particular peripheral requires more clock cycles than 52 cycles+60 ns to finish reception, the host must supply sufficient clocks to accomplish the reception. In one example, the maximum number of cycles needed may be in the range of 5000 or 6000 clock cycles. A given peripheral may have this minimum to maximum variation under various operating conditions. Also, there may be significant variation among various peripherals. As there is variation, the host should set pre-configured time period for worst case maximum scenario, which may be 5000 or 6000 clock cycles in this example.

However, it is not possible to determine pre-configured timing parameters, which are suitable for a peripheral in various operating conditions and among various peripherals. The host set worst case maximum pre-configured clock cycles (time period) may not be optimal for a given peripheral in various operating conditions or may not be optimal among various peripherals. The given peripheral or different peripherals may require anything between minimum to maximum clock cycles. In cases where peripheral needs lower or substantially lower time periods than host set pre-configured time periods, the clock unnecessarily operates for additional time period, thereby consuming additional power. Hence, in the existing MIPI standard, power dissipation on the high-speed clock lane may not be optimal as shutting-off and turning-on high-speed clock depends on pre-configured time periods, that represents the worst case scenario. Further, the pre-configured values may be suboptimal and pose challenges during design phase as well as when the system is under operation.

SUMMARY

An example of a method for dynamically switching a high-speed clock of a host device includes determining a status of the host device and a peripheral device coupled to the host device with respect to a transmission and a reception of high-speed data respectively. The method further comprises switching the high-speed clock between the host device and the peripheral device based on the status.

An example of a system that dynamically switches a high-speed clock of a host device includes circuitry that dynamically switches a high-speed clock of a host device by performing operations comprising determining a status of the host device and a peripheral device coupled to the host device with respect to a transmission and a reception of high-speed data respectively. The operations further comprise switching the high-speed clock between the host device and the peripheral device based on the status.

An example of a non-transitory computer-readable medium storing processor-executable instructions for dynamically switching a high-speed clock of a host device is disclosed. In one example, the stored instructions, when executed by a processor, cause the processor to perform operations comprising determining a status of the host device and a peripheral device coupled to the host device with respect to a transmission and a reception of high-speed data respectively. The operations further comprise switching the high-speed clock between the host device and the peripheral device based on the status.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
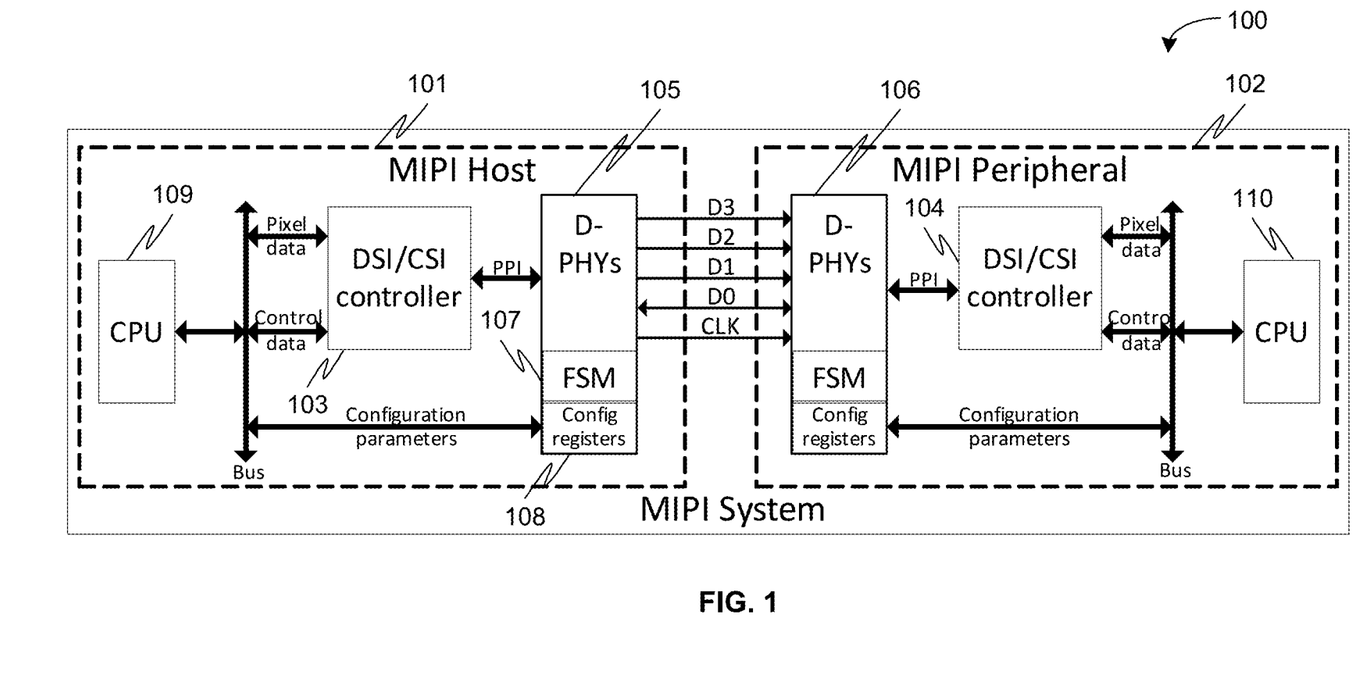
FIG. 1 is a block diagram of an example of a typical mobile industry processor interface (MIPI) system for switching a high-speed clock of a MIPI host device during data transfer.

Referring now to FIG. 1, a typical mobile industry processor interface (MIPI) system or device 100 is illustrated. The MIPI system comprises a MIPI host device 101 and a MIPI peripheral device 102. A number of data lanes or data links D0-D3 between the host 101 and the peripheral 102 along with a high-speed clock lane CLK enable transmission of data between the host 101 and the peripheral 102. It should be noted that the data lane D0 is bidirectional lane, which is also used for low power data transmission.

In high-speed data transfer mode, high-speed clock CLK is driven from the host to peripheral along with data on D0-D3 data lane. A DSI/CSI controller 103, 104 handles pixel data and control data from rest of the system to D-PHYs 105, 106 through PHY protocol interface (PPI). As stated above, the DSI/CSI are MIPI higher layer standards for display and camera interfaces respectively. The D-PHYs 105 in MIPI host has got finite state machines (FSMs) 107 and configuration registers 108 for switching (i.e., shutting-off and turning-on) CLK apart from observing and controlling data lanes D0-D3. For power saving, CLK lane supports non-continuous clock mode in conjunction with burst mode data, i.e., host shuts-off clock at the end of each data line in a video frame and/or at the end of a video frame. Thus, the host controls high-speed and low-power modes switching of data lanes D0-D3 and clock lane CLK. The data lanes D0-D3 are switched first to low-power mode, before switching clock lane CLK to low-power mode. Similarly, while switching back to high-speed mode, clock lane CLK is switched to high-speed mode first, followed by data lanes D0-D3 to high-speed mode.

The host 101 pre-configured timing parameters are programmed in the configuration registers 108 of D-PHYs 105, which controls various timing parameters of high-speed or low-power modes switching of data or clock. The D-PHYs 106 in MIPI peripheral 102 receives incoming data and clock and responds on bi-directional data lane D0, if needed. In the typical system 100, the firmware running on a processor (CPU) 109, 110 controls data and configuration path.

Figure 2:
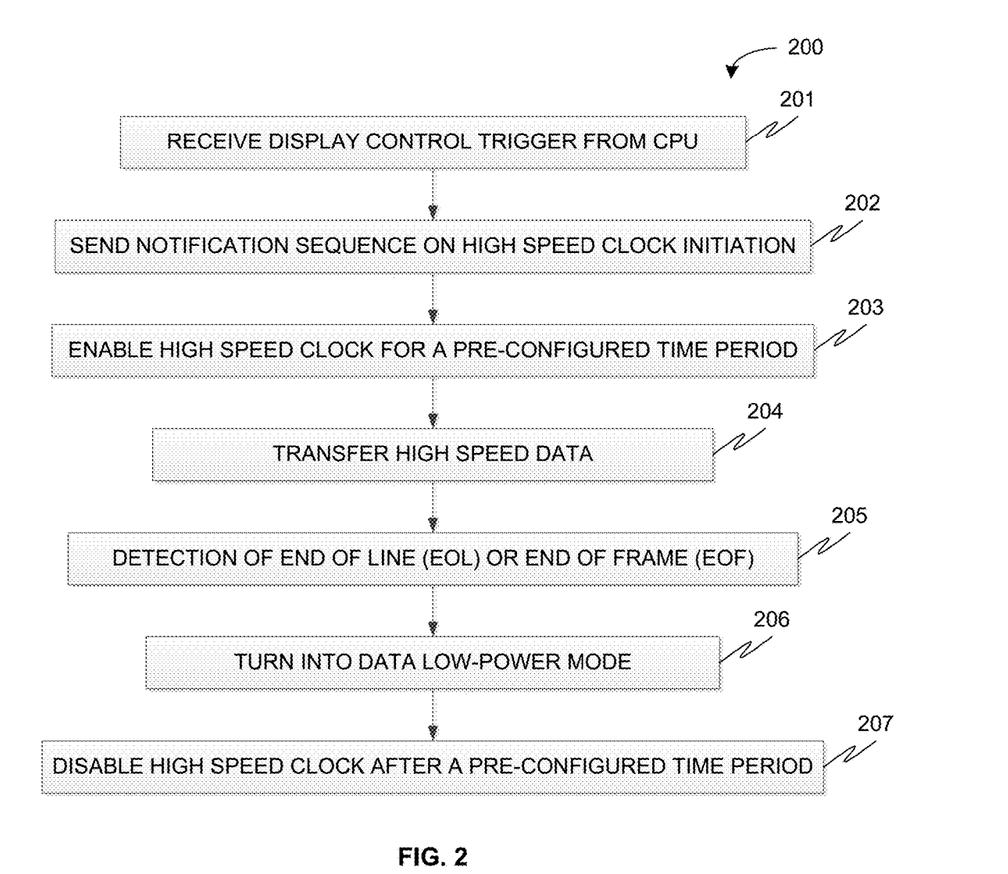
FIG. 2 is a flow diagram of an example of a typical process for switching the high-speed clock of the MIPI host device during data transfer.

A typical process 200 for switching the high-speed clock of the MIPI host device during data transfer is illustrated in FIG. 2. At step 201, a host device waits for display control trigger from the processor. During this time, the host device continues to drive stop-state on clock lane CLK. At step 202, the host device sends notification sequence on high speed clock initiation. This notification sequence includes high-speed request state on high-speed clock lane CLK for pre-configured time period. In high-speed request state, clock p and n lines are driven with low-power digital-0 and low-power digital-1 respectively. As will be appreciated by those of ordinary skill in the art, each of the data lanes D0-D3 and the clock lane CLK has differential p and n lines for differential signaling and are 180 degree out of phase with respect to the other. Further, as part of same notification sequence, the host device drives bridge state on high-speed clock lane CLK for pre-configured time period. In bridge state, clock p and n lines are driven with low-power digital-0. The peripheral devices observe transitions and enables line termination in this bridge state. Further, in the notification sequence, the host device drives differential-0 on high-speed clock lane for a pre-configured time period. In differential-0 state, clock p and n lines are driven with high-speed digital-0 and high-speed digital-1 respectively. The peripheral device prepares to receive high-speed clock signal in response to the notification sequence.

At step 203, host device drives high-speed clock lane CLK for pre-configured period before starting-up any data on the data lanes D0-D3. As discussed above, the pre-configured time period between turning-on high-speed clock to data start, set by the host device is worst case value to cater to all possible conditions of peripheral devices or among various peripheral devices. In certain situations, a given peripheral may be ready to receive high-speed data much ahead of host pre-configured time period. This means that, in some situations, the peripheral devices need much less time between turning-on high-speed clock and data than the pre-configured time period set by the host device. Further, this also means that the high-speed clock will still be driven by the host device even though peripheral does not need it anymore and it is ready to receive data. Thus, driving the high-speed clock for additional time than required causes undesirable power dissipation. Similarly, some other peripheral device may be ready to receive high-speed data much ahead of host pre-configured time period. In these conditions, power dissipation is not optimal on high-speed clock lane.

At step 204, the host device drives high-speed data. At step 205, the host device detects end of line (EoL) or end of frame (EoF) of the high-speed data being transmitted. The host device continues to drive data lanes D0-D3 and clock lane CLK in high-speed mode, until it reaches end of a video data line in a frame (EoL) or end of a frame (EoF). At step 206, the host device switches all the data lanes D0-D3 to low-power mode, as it has completed transferring last pixel data in each line and/or last pixel data at the end of the frame.

At step 207, the host device continues to drive clock lane CLK for a pre-configured time period. As discussed above, the pre-configured time period between end of high-speed data and clock shut-off is set by the host without looking at peripheral's status and is a worst case value to cater to all possible conditions of a peripherals or among various peripherals. In certain situations, a given peripheral device may complete its pending tasks dependent on high-speed clock much ahead of host pre-configured time period. This means that, in some situations, the peripheral device needs much less time between end of high-speed data and clock shut-off than the pre-configured time period set by the host device. Further, this also means that clock will still be driven by the host device even though the peripheral device does not need it anymore. Again, driving the high-speed clock for additional time than required causes undesirable power dissipation. Similarly, some other peripheral device may complete its pending tasks (dependent on high-speed clock) much ahead of host pre-configured time period. In these conditions, power dissipation is not optimal on high-speed clock lane.

The disabling of high-speed clock sequence includes driving differential-0 on high-speed clock lane for a pre-configured time period. In differential-0 state, clock p and n lines (differential lines) are driven with high-speed digital-0 and high-speed digital-1 respectively. The peripheral device detects absence of clock transitions much less than host pre-configured time and wait. The sequence further includes driving stop state for a pre-configured time period, until it wants to keep the clock lane in low-power state. In stop state, clock p and n lines are driven with low-power digital-1.

Hence, as discussed above, current MIPI standard necessitates the host device to set worst case maximum pre-configured time period for which high-speed clock is turned-on before starting first pixel data or after transferring last pixel data. However, such pre-configured time period may not be optimal for a given peripheral in various operating conditions or may not be optimal among various peripherals. In cases where peripheral needs lower time periods than host set pre-configured time periods, the clock will be unnecessarily operating for additional time period resulting in undesirable power dissipation.

It is therefore desirable to provide a system and method for dynamically and adaptively switching (shutting-off and turning-on) a high-speed clock of a host device, as opposed to static switching at pre-configured time periods in the existing technique, for minimizing the power dissipation. The dynamically and adaptively switching of the host high-speed clock is based on a status of the host device and a peripheral device coupled to the host device with respect to high-speed data transmission and reception.

Figure 3:
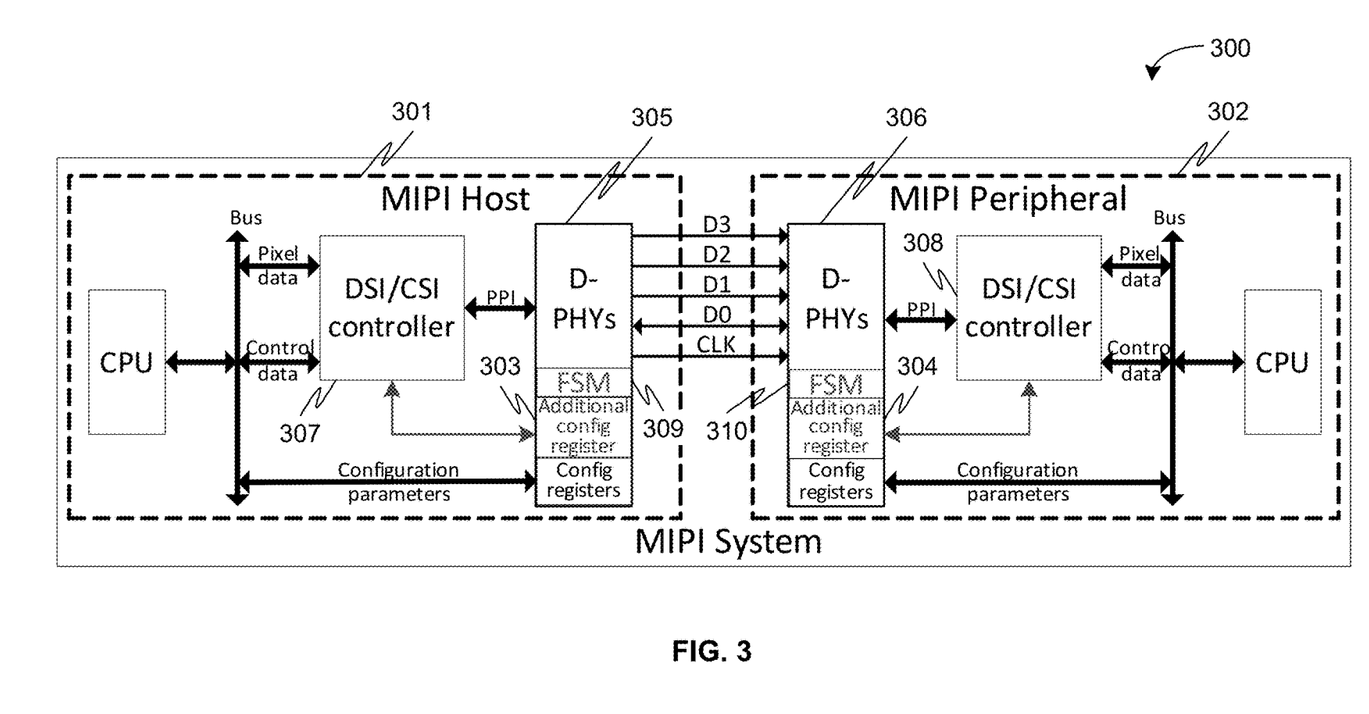
FIG. 3 is a block diagram of an exemplary system in which a high-speed clock of a host device is dynamically and adaptively switched during data transfer according to some embodiments of the present disclosure.

Referring now to FIG. 3, an exemplary system 300 in which a high-speed clock of a host device is dynamically and adaptively switched is illustrated according to some embodiments of the present disclosure. The system 300 comprises a host 301 and at least one peripheral 302. In certain embodiments, the system 300 is a computing or a mobile device comprising a MIPI circuitry. The MIPI circuitry comprises a MIPI host and at least one MIPI peripheral. In comparison to the existing system 100 discussed above, each of the host device 301 and the peripheral device 302 of the disclosed system 300 comprises an additional configuration register 303, 304 for maintaining the status of the host device 301 and the peripheral device 302 with respect to data transmission and reception respectively. As illustrated, in certain embodiments, the additional configuration registers 303, 304 are located in the D-PHYs 305, 306 of the host device 301 and the peripheral device 302. Alternatively, it should be noted that the additional configuration registers 303, 304 may be part of any other blocks including DSI/CSI controllers 307, 308.

The DSI/CSI controllers 307, 308 update the respective additional configuration registers 303, 304. Further, the FSMs 309, 310 in D-PHYs 305, 306 use the additional configuration registers 303, 304 in achieving dynamic and adaptive switching (shutting-off and turning-on) of the host high-speed clock. Each of the additional configuration registers 303, 304 update flow between the host 301 and the peripheral 302 for turning-on and shutting-off high-speed clock during data transfer is illustrated in FIG. 4.

Figure 4:
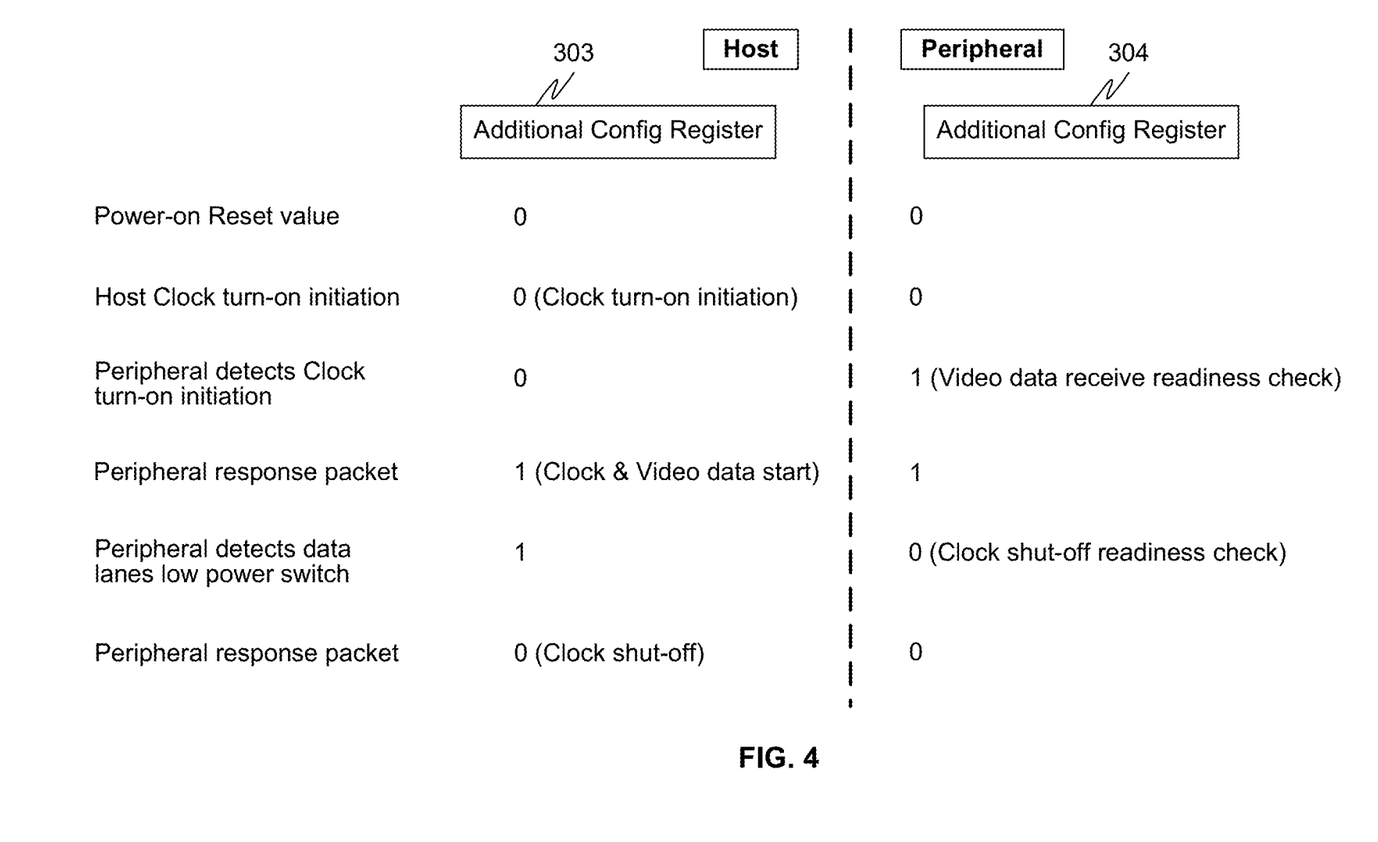
FIG. 4 is a diagram of exemplary additional configuration register status during data transfer according to some embodiments of the present disclosure.
Figure 5:
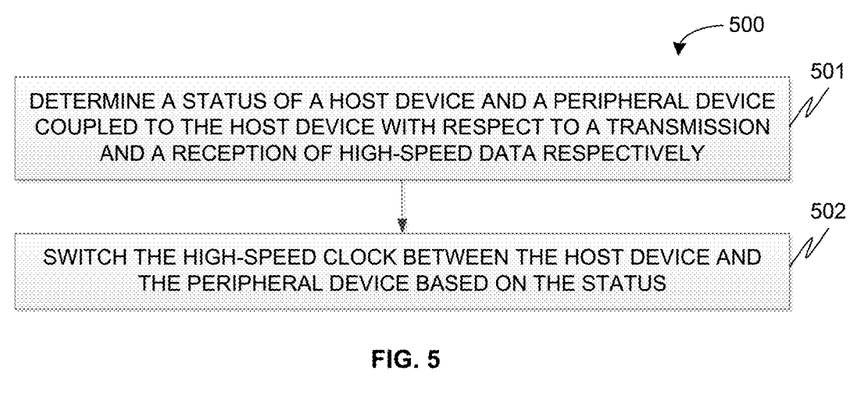
FIG. 5 is a flow diagram of an example of a method for dynamically and adaptively switching a host high-speed clock in accordance with some embodiments of the present disclosure.

Referring now to FIGS. 4 and 5, each of the additional configuration register 303, 304 in the host and the peripheral have default power-on value of '0'. For starting data transmission (e.g., transfer of a video line or frame), the host first sends a notification on high-speed clock initiation to the peripheral device. The hosts then bus turn around (BTA) and waits for peripherals response on readiness of receiving high-speed data. As soon as peripheral senses the high-speed clock initiation notification from the host device, it updates its additional configuration register in peripheral to '1'. This indicates the peripheral device that the host device is ready to send high-speed clock and data (e.g., video data) of line or frame. The peripheral device checks for its readiness to start receiving high-speed data upon seeing the indication in its additional configuration register (i.e., '0' to '1' transition). Once peripheral is ready to receive high-speed video data, it informs back the host. The peripheral device responds back to host with a pre-configured peripheral readiness response (PRR) packet and gives the bus control back to host. This pre-configured PRR packet reaches DSI/CSI controller in host, where it is decoded. Whenever, the DSI/CSI controller in the host receives pre-configured PRR packet, it updates additional configuration register in its D-PHYs to '1'. The host device enables or turns-on the high-speed clock and starts sending video data upon seeing this peripheral response in additional configuration register (i.e., '0' to '1' transition).

As soon as the DSI/CSI controller of the host device sends out end of the high-speed data (e.g., last pixel of a video line or frame), it switches the data lanes to low-power mode, does BTA, and waits for peripherals response. As soon as the peripheral devices senses low-power mode switching on data lanes, it updates its additional configuration register to '0'. This '1' to '0' transition on additional configuration register indicates the peripheral device that the host device has sent all the data that was to be transmitted and is now ready to shut-off the high-speed clock. After seeing this '1' to '0' transition in additional configuration register, the peripheral device checks for pending tasks which needs high-speed clock for completion. Once all the pending tasks which needs high-speed clock are completed, the peripheral device informs back the host device. The peripheral device responds back to the host device with a pre-configured transfer completion response (TCR) packet and gives the bus control back to host. This pre-configured response packet reaches DSI/CSI controller in host, where it is decoded. Whenever, the DSI/CSI controller in the host receives pre-configured TCR packet, it updates additional configuration register in its D-PHYs to '0'. This '1' to '0' transition in additional configuration register indicates to the host that peripheral has completed pending tasks, which needs high-speed clock. The host device then disables or shuts-off the clock.

The pre-configured response packets (e.g., PRR and TCR) may be any short or any long packet capable of being transported on data lane D0-D3. In certain embodiments, the additional registers of the host device and the peripheral device talks or synchronizes with each other via D0 bidirectional data lane. Thus, a bidirectional handshake mechanism is designed to synchronize the host and the peripheral for high-speed clock switching during data transfer. Further, as will be appreciated by those skilled in the art, the switching (i.e., turning-on and shutting-off) of high-speed clock with respect to high-speed data is based on a status of the host device and the peripheral device coupled to the host device with respect to data transmission and reception, as opposed to the pre-configured time period provided by the exiting techniques.

It should be noted that the controllers, D-PHYs, FSM, configuration registers, and other such components or modules may be implemented in application specific integrated circuits (ASICs), system on chip (SoC), or other programmable hardware devices such as programmable gate arrays, programmable array logic, programmable logic devices, and so forth. Alternatively, these modules or components may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for dynamically and adaptively switching a host high-speed clock. In particular, a variety of processes may be employed for dynamically switching the host high-speed clock based on a status of a host device and a peripheral device coupled to the host device with respect to high-speed data transmission and reception, and without depending on pre-configured time periods set by the host device based on worst case scenarios. For example, the exemplary system 300 may dynamically switch the host high-speed clock by the processes discussed herein. In particular, as will be appreciated by those of ordinary skill in the art, control logic and/or automated routines for performing the techniques and steps described herein may be implemented by the system 300, either by hardware, software, or combinations of hardware and software. For example, suitable code may be accessed and executed by the one or more processors on the system 300 to perform some or all of the techniques described herein. Similarly application specific integrated circuits (ASICs) configured to perform some or all of the processes described herein may be included in the one or more processors on the system 300.

For example, referring now to FIG. 5, exemplary control logic 500 for dynamically switching a host high-speed clock via a system, such as system 300, is depicted via a flowchart in accordance with some embodiments of the present disclosure. As illustrated in the flowchart, the control logic 500 includes the steps of determining a status of the host device and a peripheral device coupled to the host device with respect to a transmission and a reception of high-speed data respectively at step 501, and switching the high-speed clock between the host device and the peripheral device based on the status at step 502.

In certain embodiments, determining the status at step 501 may further include the steps of sending a notification on high-speed clock initiation from the host device to the peripheral device, and receiving an indication from the peripheral device on a readiness to receive the high-speed data in response to the notification on high-speed clock initiation. Further, in some embodiments, switching the high-speed clock at step 502 comprises enabling the high-speed clock in response to the indication on the readiness to receive the high-speed data. In certain embodiments, the exemplary control logic 500 may further include the step of transferring the high-speed data from the host device to the peripheral device upon enabling the high-speed clock.

Additionally, in certain embodiments, determining the status at step 501 may include the step of receiving an indication from the peripheral device on a completion of transmission of the high-speed data. Further, in some embodiments, receiving the indication on the completion of transmission of the high-speed data may include the steps of detecting an end of the high-speed data being transferred from the host device to the peripheral device, and switching a plurality of data lanes to a low-power mode upon detecting the end of the high-speed data. In certain embodiments, switching the high-speed clock at step 502 comprises disabling the high-speed clock in response to the indication on the completion of transmission of the high-speed data.

Figure 6:
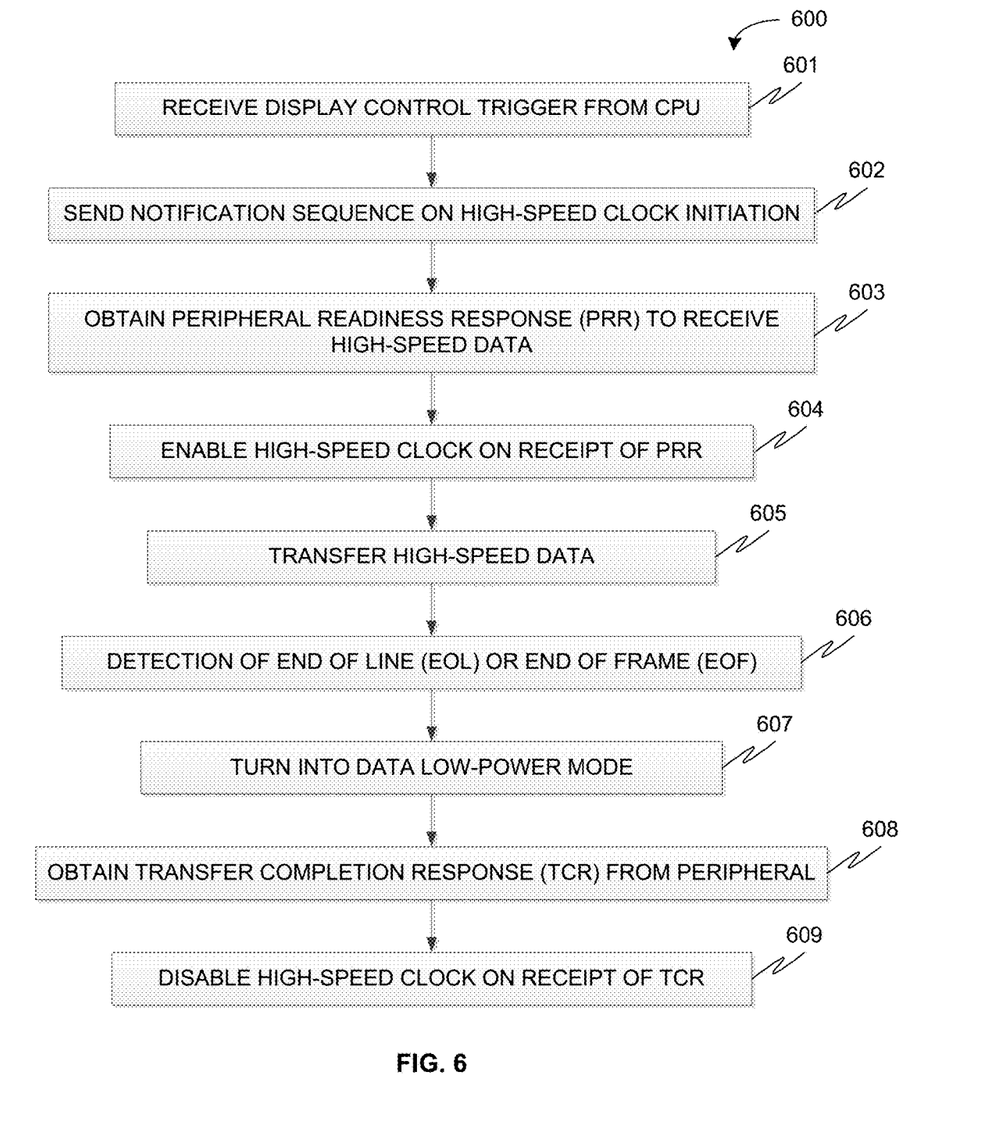
FIG. 6 is a flow diagram of a detailed example of a method for dynamically and adaptively switching a host high-speed clock in accordance with some embodiments of the present disclosure.

Referring now to FIG. 6, exemplary control logic 600 for dynamically switching a host high-speed clock is depicted in greater detail via a flowchart in accordance with some embodiments of the present disclosure. The control logic 600 includes additional steps 603 and 608 and modified steps 604 and 609 as compared to existing process 200 illustrated in FIG. 2 and described above.

At step 601, host device waits for display control trigger from the processor. During this time, host device continues to drive stop-state on clock lane CLK. At step 602, the host device sends notification sequence on high speed clock initiation. This notification sequence includes high-speed request state on high-speed clock lane CLK for pre-configured time period. In high-speed request state, clock p and n lines are driven with low-power digital-0 and low-power digital-1 respectively. Further, as part of same notification sequence, the host device drives bridge state on high-speed clock lane CLK for pre-configured time period. In bridge state, clock p and n lines are driven with low-power digital-0. The peripheral devices observe transitions and enables line termination in this bridge state. Further, in the notification sequence, the host device drives differential-0 on high-speed clock lane for a pre-configured time period. In differential-0 state, clock p and n lines are driven with high-speed digital-0 and high-speed digital-1 respectively. The peripheral device prepares to receive high-speed data in response to the high-speed clock initiation notification sequence.

At additional step 603, the host device obtains peripheral readiness response (PRR) to receive high-speed data. The host device first initiates BTA process for it to receive response from the peripheral. Additionally, the host device waits for readiness response to receive high-speed data from the peripheral device. Further, the host device waits for BTA data lane control back to host from the peripheral device. At modified step 604 (corresponding to step 203 of the existing process 200), the control logic 600 depends on peripheral readiness response (PRR) to enable (i.e., turn-on) the high-speed clock instead of depending on pre-configured time period.

At step 605, the host device drives high-speed data. At step 606, the host device detects end of line (EoL) or end of frame (EoF) of the high-speed data being transmitted. The host device continues to drive data lanes D0-D3 and clock lane CLK in high-speed mode, until it reaches end of a video data line in a frame (EoL) or end of a frame (EoF). At step 607, the host device switches all the data lanes D0-D3 to low-power mode, as it has completed transferring last pixel data in each line and/or last pixel data at the end of the frame.

At additional step 608, the host device obtains transfer completion response (TCR) from the peripheral device for the high-speed data being transferred. The transfer completion includes completion of pending tasks based on high-speed clock. The host device first initiates BTA process for it to receive response from the peripheral device. Additionally, the host device waits for transfer completion response of the high-speed data from the peripheral device. At modified step 609 (corresponding to step 207 of the existing process 200), the control logic 600 depends on peripheral transfer completion response (TCR) to disable (i.e., shut-off) the high-speed clock instead of depending on pre-configured time period.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, where when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
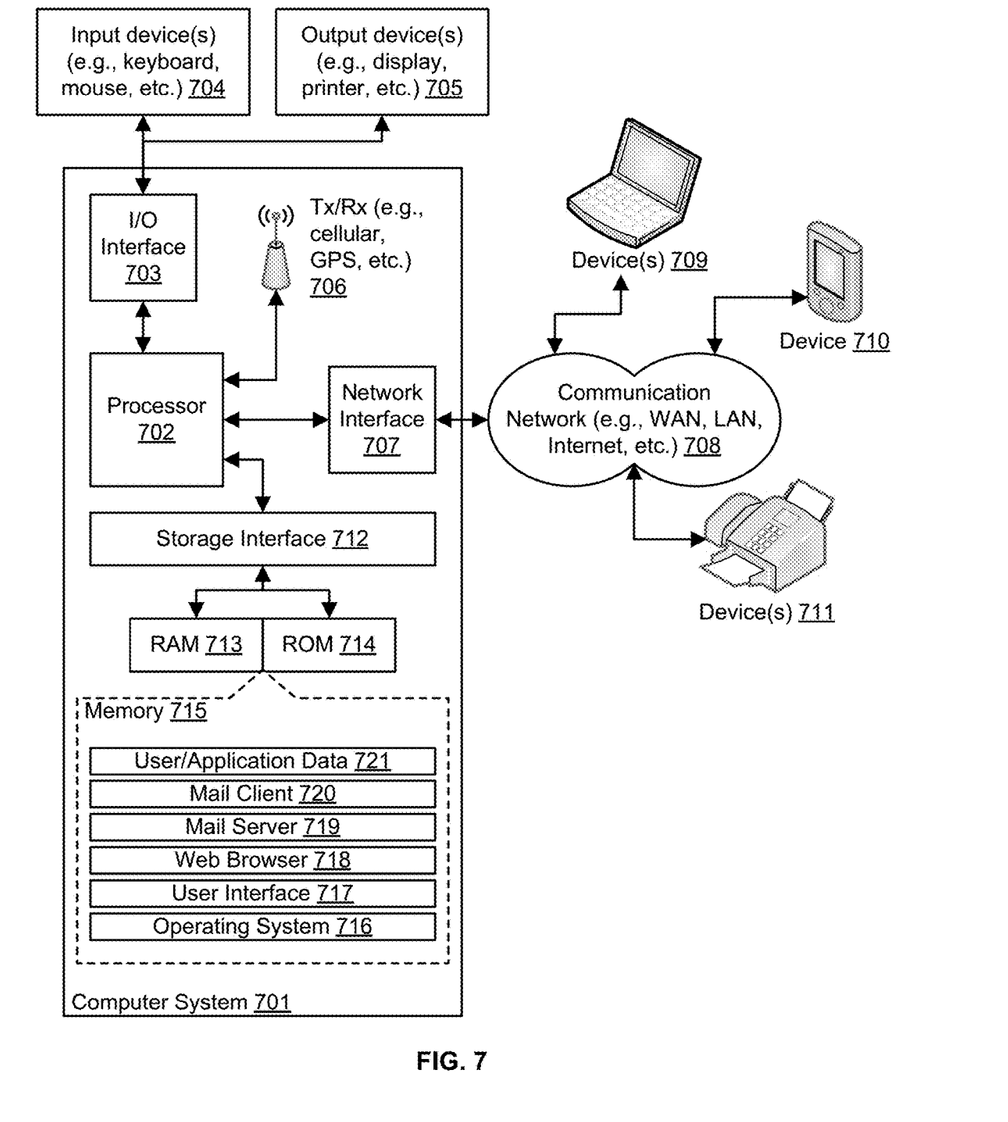
FIG. 7 is a block diagram of an exemplary computer system for implementing embodiments consistent with the present disclosure.

Referring now to FIG. 7, a block diagram of an exemplary computer system 701 for implementing embodiments consistent with the present disclosure is illustrated. Variations of computer system 701 may be used for implementing a mobile device or a computing device comprising of a host and at least one peripheral wherein techniques for dynamically and adaptively switching the host high-speed clock may be practiced. Computer system 701 may comprise a central processing unit ("CPU" or "processor") 702. Processor 702 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709, 710, and 711. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 701 may implement a web browser 718 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail, Microsoft Entourage, Microsoft Outlook, Mozilla Thunderbird, etc.

In some embodiments, computer system 701 may store user/application data 721, such as the data, variables, records, etc. (e.g., peripheral readiness response packet, transfer completion response packet, high-speed data, values of configuration registers and additional configuration registers, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above results in dynamic and adaptive switching (i.e., turning-on and shutting-off) of host high-speed clock for data transfer based on a status of the host device and the peripheral device with respect to transmission and reception of high-speed data, and without depending on pre-configured timing parameters set by the host device based on the worst case scenarios. In other words, the techniques provide for power optimized data transfer by dynamically and adaptively shutting-off and turning-on host high-speed clock with respect to last and first pixel of a video line or frame, based on peripheral it is connected to, as opposed to depending on host pre-configured time periods as in existing method. As will be appreciated by those skilled in the art, the disclosed system and method for dynamic and adaptive switching of host high-speed clock results in optimal power utilization on high-speed clock lane and minimization of undesirable power dissipation.

In the techniques described in the various embodiments discussed above, the host looks into response from peripheral for turning-on and shutting-off the high-speed clock. The host looks for readiness to accept data in case of turning-on clock and transfer completion response in case of shutting-off the clock. Hence, high-speed clock turning-on and shutting-off dynamically and adaptively depends on the status of host and the peripheral devices with respect to data transmission and reception rather than pre-configured time-periods, thereby saving power.

The specification has described system and method for dynamically switching a high-speed clock of a host device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for dynamically switching a source synchronous high-speed clock of a host device in a mobile industry processor interface (MIPI) system, the method comprising:
determining, by at least one of configurable hardware logic or a processor, a status of the host device and a peripheral device coupled to the host device with respect to a transmission and a reception of high-speed data respectively during high-speed data transfer in burst data and non-continuous clock mode;
switching-ON or switching-OFF, by the at least one of the configurable hardware logic or the processor, the source synchronous high-speed clock between the host device and the peripheral device based on the status of the host device and the peripheral device;
detecting, by the at least one of the configurable hardware logic or the processor, an end of the high-speed data transfer, wherein the end of the high-speed data transfer is detected based on an end of line or end of frame of the high-speed data; and
switching, by the at least one of the configurable hardware logic or the processor, a plurality of data lanes to a low-power mode upon detecting the end of the high-speed data transfer, the source synchronous high-speed clock being switched-OFF based on the low-power mode.

2. The method of claim 1, wherein determining the status further comprises sending, by the at least one of the configurable hardware logic or the processor, a notification on high-speed clock initiation from the host device to the peripheral device.

3. The method of claim 2, wherein determining the status further comprises receiving, by the at least one of the configurable hardware logic or the processor, an indication from the peripheral device on a readiness to receive the high-speed data in response to the notification on high-speed clock initiation.

4. The method of claim 3, wherein switching-ON the source synchronous high-speed clock further comprises switching-ON, by the at least one of the configurable hardware logic or the processor, the source synchronous high-speed clock in response to the indication on the readiness to receive the high-speed data.

5. The method of claim 4, further comprising transferring, by the at least one of the configurable hardware logic or the processor, the high-speed data from the host device to the peripheral device upon switching-ON the source synchronous high-speed clock.

6. The method of claim 1, wherein determining the status further comprises receiving, by the at least one of the configurable hardware logic or the processor, an indication from the peripheral device on a completion of transmission of the high-speed data.

7. The method of claim 6, wherein switching-OFF the source synchronous high-speed clock further comprises switching-OFF, by the at least one of the configurable hardware logic or the processor, the source synchronous high-speed clock in response to the indication on the completion of transmission of the high-speed data.

8. A switching apparatus for dynamically switching a source synchronous high-speed clock of a host device in a mobile industry processor interface (MIPI) system, comprising:
at least one of configurable hardware logic configured to be capable of implementing programmed instructions or a processor coupled to a memory and configured to execute programmed instructions stored in the memory to;
determine a status of the host device and a peripheral device coupled to the host device with respect to a transmission and a reception of high-speed data respectively during high-speed data transfer in burst data and non-continuous clock mode;
switch-ON or switch-OFF the source synchronous high-speed clock between the host device and the peripheral device based on the status of the host device and the peripheral device;
detect an end of the high-speed data transfer, wherein the end of the high-speed data transfer is detected based on an end of line or end of frame of the high-speed data; and
switch a plurality of data lanes to a low-power mode upon detecting the end of the high-speed data transfer, the source synchronous high-speed clock being switched-OFF based on the low-power mode.

9. The apparatus of claim 8, wherein determining the status further comprises sending a notification on high-speed clock initiation from the host device to the peripheral device.

10. The apparatus of claim 9, wherein determining the status further comprises receiving an indication from the peripheral device on a readiness to receive the high-speed data in response to the notification on high-speed clock initiation.

11. The apparatus of claim 10, wherein switching-ON the source synchronous high-speed clock further comprises switching-ON the source synchronous high-speed clock in response to the indication on the readiness to receive the high-speed data.

12. The apparatus of claim 11, wherein the at least one of the configurable hardware logic or the processor is further configured to transfer the high-speed data from the host device to the peripheral device upon switching-ON the source synchronous high-speed clock.

13. The apparatus of claim 8, wherein determining the status further comprises receiving an indication from the peripheral device on a completion of transmission of the high-speed data.

14. The apparatus of claim 13, wherein switching-OFF the source synchronous high-speed clock further comprises switching-OFF the source synchronous high-speed clock in response to the indication on the completion of transmission of the high-speed data.

15. A non-transitory computer readable medium having stored thereon instructions for dynamically switching a source synchronous high-speed clock of a host device in a mobile industry processor interface (MIPI) system, the instructions comprising machine executable code which when executed by at least one processor, causes the at least one processor to perform steps comprising:
  determining a status of the host device and a peripheral device coupled to the host device with respect to a transmission and a reception of high-speed data respectively during high-speed data transfer in burst data and non-continuous clock mode;
  switching-ON or switching-OFF the source synchronous high-speed clock between the host device and the peripheral device based on the status of the host device and the peripheral device;
  detecting an end of the high-speed data transfer, wherein the end of the high-speed data transfer is detected based on an end of line or end of frame of the high-speed data; and
  switching a plurality of data lanes to a low-power mode upon detecting the end of the high-speed data transfer, the source synchronous high-speed clock being switched-OFF based on the low-power mode.

16. The medium of claim 15, wherein determining the status further comprises:
  sending a notification on high-speed clock initiation from the host device to the peripheral device; and
  receiving an indication from the peripheral device on a readiness to receive the high-speed data in response to the notification on high-speed clock initiation; wherein switching-ON the source synchronous high-speed clock further comprises enabling switching-ON the source synchronous high-speed clock in response to the indication on the readiness to receive the high-speed data.

17. The medium of claim 16, further comprising storing processor-executable instructions for transferring the high-speed data from the host device to the peripheral device upon switching-ON the source synchronous high-speed clock.

18. The medium of claim 15, wherein determining the status further comprises:
  receiving an indication from the peripheral device on a completion of transmission of the high-speed data in response to switching the plurality of data lanes to the low-power mode; wherein switching-OFF the source synchronous high-speed clock further comprises switching-OFF the source synchronous high-speed clock in response to the indication on the completion of transmission of the high-speed data.

* * * * *